Aug. 4, 1931.  E. A. ROBERTS  1,817,018
AUTOMATIC TAPER THREAD CUTTING TOOL
Filed Aug. 17, 1927  5 Sheets-Sheet 1

INVENTOR
EDWARD A. ROBERTS
Atty.

Aug. 4, 1931.    E. A. ROBERTS    1,817,018
AUTOMATIC TAPER THREAD CUTTING TOOL
Filed Aug. 17, 1927    5 Sheets-Sheet 5

INVENTOR
EDWARD A. ROBERTS
ATTORNEY

Patented Aug. 4, 1931

1,817,018

UNITED STATES PATENT OFFICE

EDWARD A. ROBERTS, OF LONG BEACH, CALIFORNIA

AUTOMATIC TAPER THREAD CUTTING TOOL

Application filed August 17, 1927. Serial No. 213,489.

This invention relates to threading machines and, more particularly is one for cutting tapered threads on such instruments as the pins of tool joints used in oil well drilling equipment.

The primary object of the invention is to provide such a device which will cut threads quickly, automatically and accurately. Another important object is to present a machine which is relatively simple in construction and whose cost of manufacture is relatively small as compared with machines of satisfactory construction which have been used heretofore. A further object is to produce a machine which shall also be durable and positive in operation, shall have a minimum number of parts, and in which the work may be easily mounted.

Briefly stated, the invention resides in a work holder in combination with a carrier for movable thread cutters, a connection being provided between the holder and the carrier to advance the cutters properly as the thread is cut, means being also provided to feed the cutters with respect to the work holder in order that the depth of cut may be increased from time to time. In a preferred form the thread cutters are mounted to move at an inclination to the axis upon which the work holder rotates, inclined guides being provided to determine this movement, and cam means and a screw feed being provided to produce the movement. Said cam means perform the functions of feeding the cutters at the proper pitch as the thread is being cut, of raising the cutters from the work at the end of a cutting step, and of returning and lowering the cutters for the next step. In the form herein shown, the functions of advancing the cutters at the proper pitch and returning them to working position are performed through the medium of a cam groove in one cam ring with which the cutters are directly connected, and the functions of raising and lowering the cutters are performed by another cam ring and groove connected with the first mentioned cam ring and with the carrier. An automatic screw feed serves to advance the cam rings with respect to the work holder and the work therein, and thereby feed the cutters to deepen the cut, this screw being constructed to compensate for all variations in movement with respect to the position of thread portions previously cut. The invention also resides in such other features of novelty as may be herein presented.

In the accompanying drawings wherein one embodiment of the invention is presented merely by way of illustration, Fig. 1 is a vertical section showing all parts in operative position with a tool joint in place upon whose pin a tapered thread is being cut;

Figure 1:
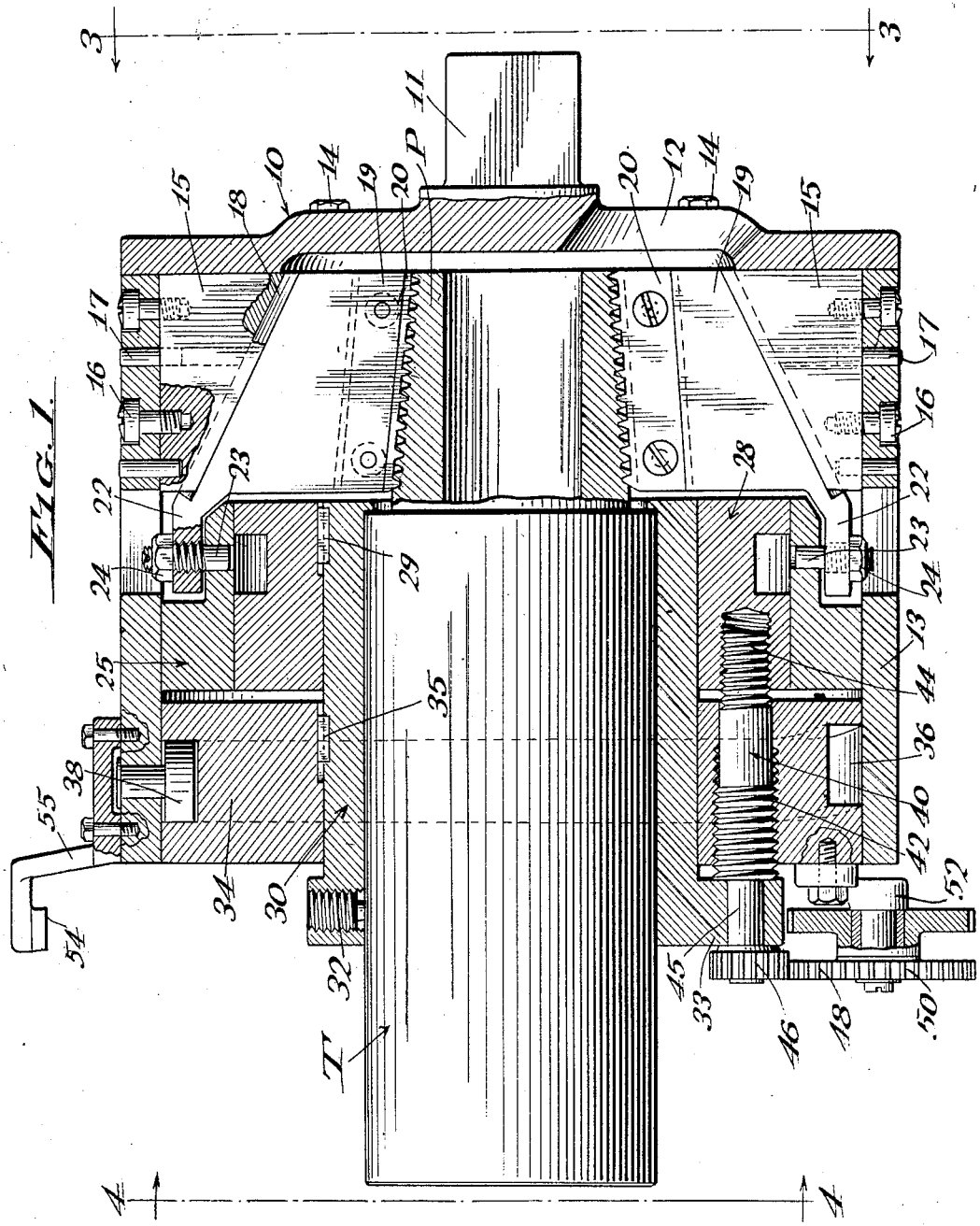
Figure 2:
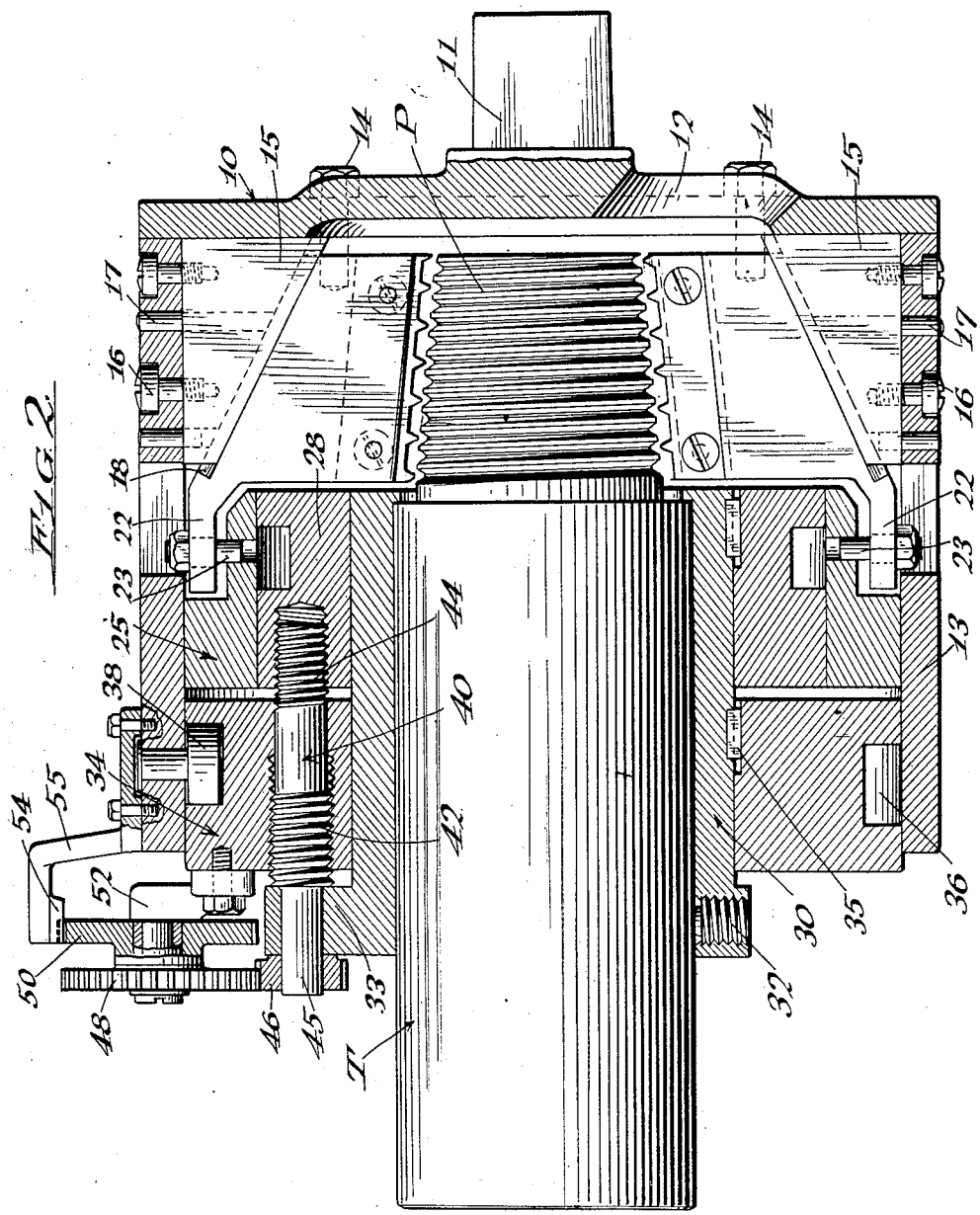
Fig. 2 is a similar view showing the cutters lifted through the operation of one cam preparatory to return of the cutters to the starting position through the medium of the other cam.
Figure 3:
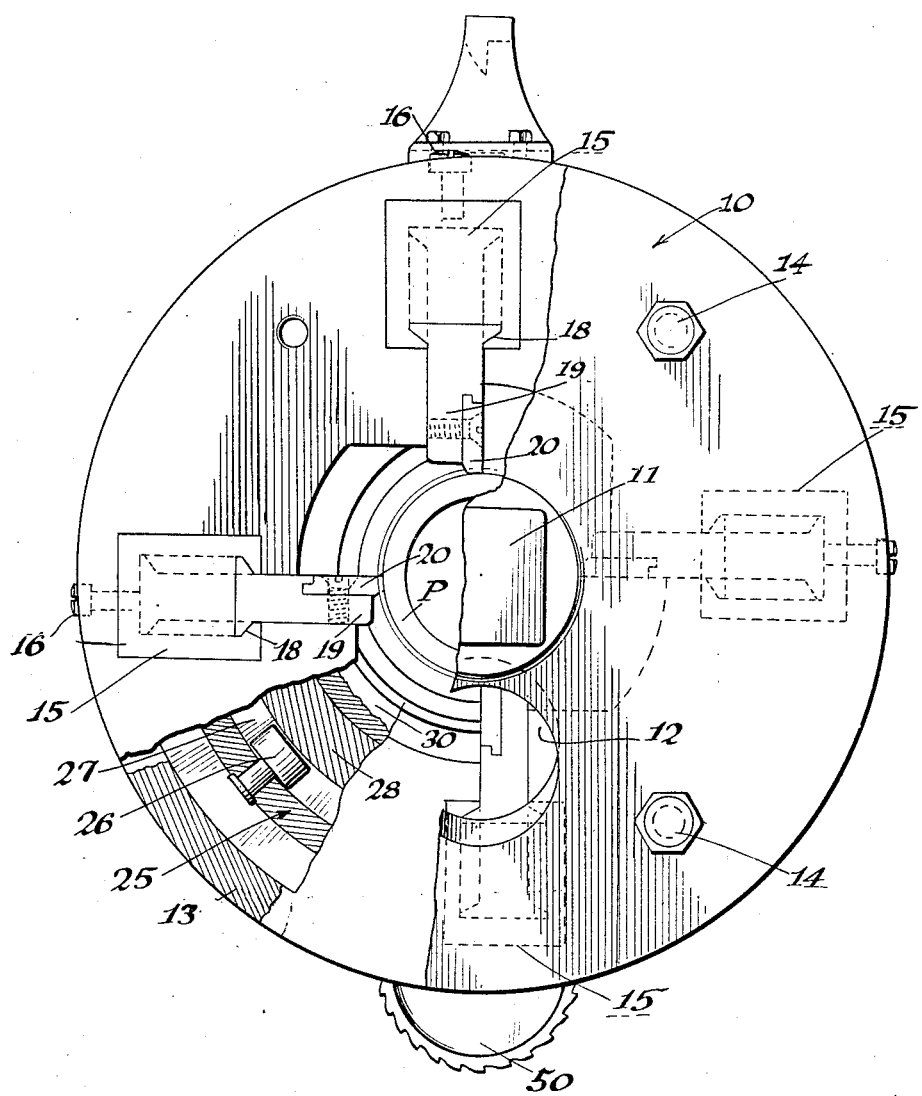
Fig. 3 is a rear elevation with parts broken away looking from the line 3—3 of Fig. 1.
Figure 4:
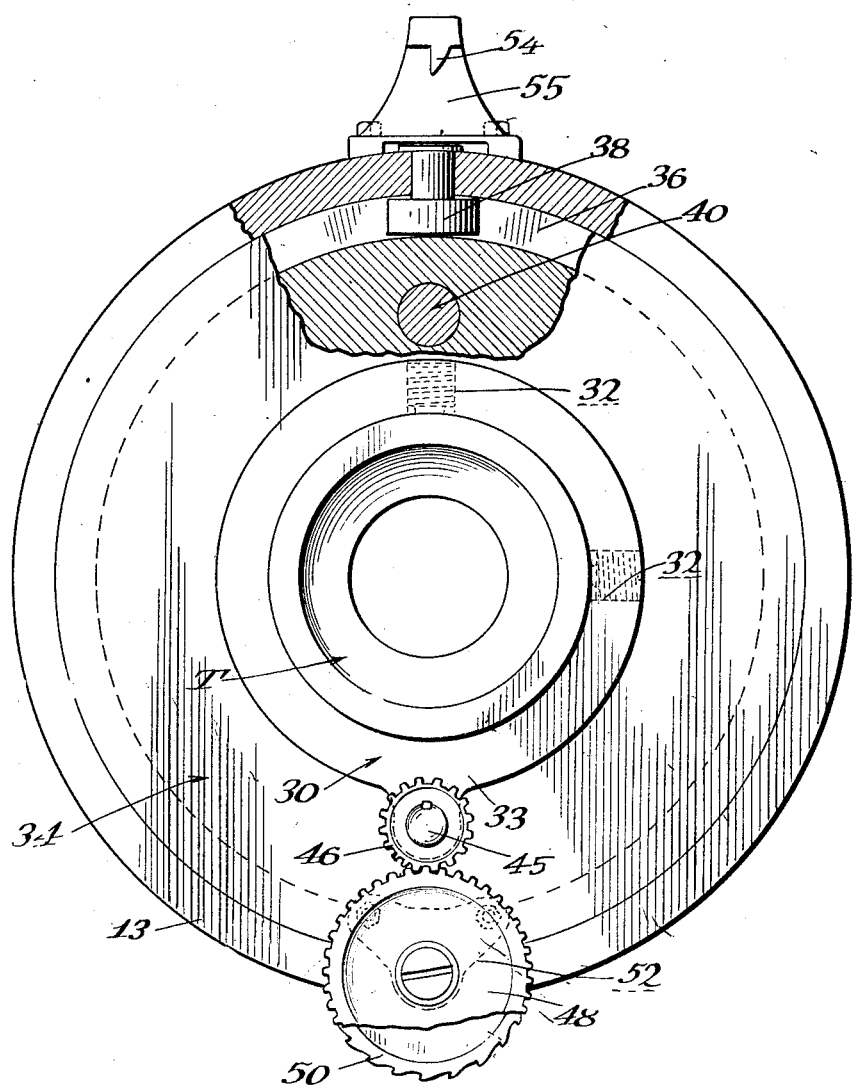
Fig. 4 is a front elevation looking from the line 4—4 of Fig. 1.
Figure 5:
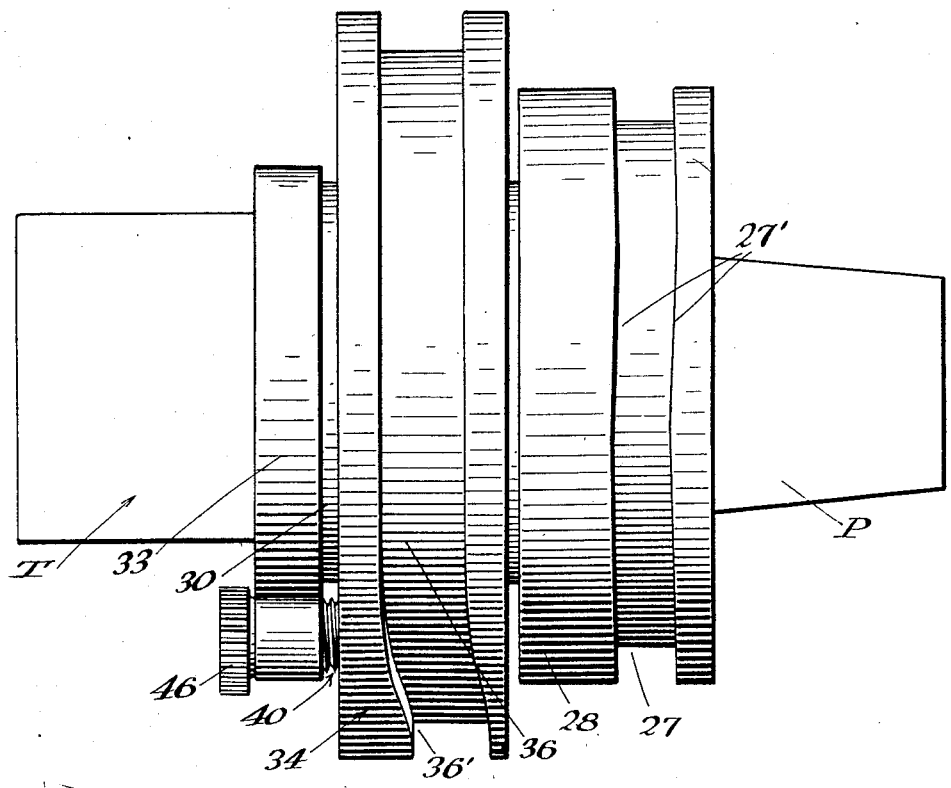
Fig. 5 is a side elevation of the cam rings and associated parts, the casing, cutters and carrier being removed.
Figure 6:
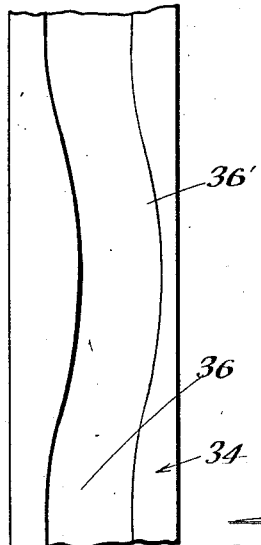
Fig. 6 represents the contours of the cams.

The cutter carrier is shown as comprising a head 10 having a squared stub 11 adapted to be mounted in a turret head or the like to hold the carrier against rotation, said head 10 being provided with an opening 12 in its lower portion for the escape of chips. The carrier also includes a casing 13 secured to the head 10 by means of screws 14 which are threaded into portions of appreciable mass as best seen in Fig. 3, and set into these massive portions is a plurality of cutter guides or holders 15 which are secured and positioned by means of screws 16 and pins 17, the guides being dovetailed at 18 to receive cutter blocks 19 which reciprocate therein and carry the thread cutters 20 whose cutting teeth are adapted to cut only on their forward edges, that is, the edges at the left as seen in the drawings. As clearly shown, the effective or dovetailed portion of each guide is disposed at an inclination to the axis of the machine, so that as the cutters move in said guides they travel toward and away from said axis, the cutter teeth themselves being set in parallelism with the tapered wall to be threaded on the pin P of the tool joint T which is to be mounted in a lathe chuck in order that rotation may be imparted thereto.

The cutter blocks 19 are so mounted as to be backed up in the direction of strain by the massive portions of the casing 13. Movement of each block 19 is accomplished by means of an extension finger 22 which has a stud 23 threaded thereinto and retained by a lock nut 24, said stud being received in an aperture which is provided in a shifting ring 25 with which all of the other cutter blocks are similarly connected. The inner side of shifting ring 25 carries one or more rollers 26 which engage in a cam groove 27 of a cam ring 28 splined at 29 on a sleeve 30 which constitutes the work carrier and receives the tool joint T, the latter being bound in position by means of set screws 32 carried in a flange 33 of said sleeve. Also splined on the sleeve 30 is a second cam ring 34 whose spline is indicated at 35, this ring being provided with a cam groove 36 which receives one or more cam rollers 38 carried by the casing 13.

The cam groove 27 in cam ring 28 serves to advance the cutters axially as the thread is being formed and to return the same to starting position after a given step, while the cam groove 36 in ring 34 serves to lift or withdraw the cutters radially following a thread cutting step and to return them to the work after they have been set back in starting position. In order that the movement produced by cam groove 36 may be imparted to the cutters, the two cam rings 28 and 34 are connected by means of a double threaded screw 40 having large threads 42 engaging in ring 34 and smaller threads 44 engaging in the smaller ring 28, whereby as the ring 34 is moved, like movement is imparted to the ring 28. In order that the cutters may be gradually fed radially to the work to increase the depth of cut, a smooth extension 45 of the screw 40 passes through the flange 33 and carries a pinion 46 which meshes with a gear 48 fixed on a toothed wheel 50 mounted on a bracket 52 carried by the cam ring 34, the teeth of wheel 50 being adapted to engage at each revolution with a projecting finger 54 carried by a bracket 55 secured on the casing 13.

Thus as the screw 40 is partially rotated through partial rotation of the wheel 50 by engagement with finger 54, the flange 33 and the cam ring 34 are drawn relatively closer, thereby bringing the cutter guides 15 and the work relatively closer axially, the cutter teeth 20 thus being forced closer to the work radially to increase the depth of the cut. At the same time it is necessary that the cutting edges of the teeth of the thread cutters 20 be fed axially forward (to the left) to increase the cut on the sides of the threads, and for this purpose the threads 44 of screw 40 are provided to work in and to advance cam ring 28. Since it is desired that this axial feed be only about half of the radial feed, the pitch of threads 44 is only about half of the pitch of threads 42. The feed to increase the cut as just described takes place during the interval when the cutters are lifted from the work.

Describing the operation as a whole, the tool joint T is secured in the work holder 30 by the screws 32 and is fixed in the chuck of a lathe, and squared stub 11 is held in a turret head against rotation. As the joint T is turned, the four cutters 20 proceed to cut threads, and in order that the required thread pitch may be obtained, the cam groove 27 is pitched spirally for the greater portion of its length to produce the proper advance, during which advance the relatively inclined dovetailed guiding connections 18 serve to produce the required small amount of radial withdrawal, the inclination of these guides being about 2 to 1 as shown. During this operation, the roller 38 has been running in a straight portion of the cam groove 36 so that no effect has been produced by said groove 36. However, when the said advancing portion of the cam groove 27 has performed its function, a sharply inclined portion 27' of the groove 27 comes into play to return the cutters that amount which they were previously advanced. Meanwhile, the toothed wheel 50 has passed the projecting finger on the bracket 55 and rotated the screw 40 that amount necessary to feed the cutter teeth radially and axially a little closer to the work to increase the depth of the thread on the next cut as described in the preceding paragraph. Then the cam groove 36 returns the cam ring 34 to its normal position and through the medium of the screw 40 and the cam ring 28 the cutters are dropped back into threading engagement. The screw portions 42 and 44 take care of that differential of feed required to insure proper advance of the cutter teeth with respect to the previously formed thread portions. Since four cutters 20 are provided, a thread is formed entirely around the work in about a half revolution before the cutters are lifted from the work, but since this thread is of inadequate depth the operation is repeated until a complete thread is produced, about eighteen revolutions being required in practice to obtain this result.

What I claim is:

1. A machine for automatically cutting a tapered thread comprising a work holder and a cutter carrier mounted in relation to a common axis, a cutter tool carried by said carrier, the longitudinal axis of said cutter being inclined with respect to the common axis of the work holder and carrier, means to feed the cutter tool radially, means to feed the cutter tool axially, and means correlating said radial and axial feeding means to produce a succession of progressive cuts.

2. A machine for cutting tapered thread comprising a work holder rotatable about an axis, a carrier, said holder being rotatable relative to said carrier, a mounting on said carrier positioned at an inclination to said axis, a thread cutter movable on said mounting to cut a tapered thread on work in the holder, means to feed the cutter radially with respect to the work, means to feed the cutter axially with respect to the work, and means for alternately withdrawing and returning the cutter to produce a succession of progressive cuts.

3. In a taper thread cutting machine, a work holder and an inclined mounting arranged in relation to a common axis, a cutter movably carried by said mounting, means to automatically move the mounting with respect to the work holder and the cutter to feed the cutter to the work radially, means to feed the cutter axially with respect to the work and means correlating said radial and axial feeding means to produce a succession of progressive cuts.

4. A machine for cutting taper thread comprising a relatively rotary work holder and a cutter working in relation to a common axis, a pair of cam members, a connection between one cam member and the cutter to move the cutter toward and from said axis, a connection between the other cam member and the cutter to advance and return the cutter axially of the work, and an adjustable connection between the cam members to shift one cam member with respect to the other.

5. A machine for cutting taper thread comprising a work holder and a co-axial cutter mounted in relation to a common axis, the holder being rotatable relative to the cutter, a pair of cam members, a connection between one cam member and the cutter to move the cutter toward and from the axis of rotation, and a connection between the other cam member and the cutter to advance and return the cutter axially of the work, a connection between the cam members, means to shift one cam member with respect to the work to feed the cutter radially and to feed the cutter axially through said connection.

6. A machine for cutting tapered threads comprising a work holder rotatable about an axis, a carrier, said work holder being rotatable relative to said carrier, a thread cutter mounted on said carrier at an inclination to said axis in order to cut a tapered thread, and a connection between said holder and said cutter for alternately feeding and returning the latter automatically to form successive and progressive cuts, said connection comprising a ring having a cam groove, and a roller traveling in said groove and connected with the cutter to shift the latter.

7. A machine for cutting tapered threads comprising a work holder rotatable about an axis, a carrier, said work holder being rotatable relative to said carrier, a thread cutter mounted on said carrier to move at an inclination to said axis in order to cut a tapered thread, and a connection between said holder and said cutter for shifting the latter automatically, said connection comprising cam means to advance the cutter as a thread is cut and to return the cutter, and cam means to withdraw the cutter from the work and to restore the same after said return.

8. A machine for cutting tapered threads comprising a work holder rotatable about an axis, a carrier, said work holder being rotatable relative to said carrier, a thread cutter mounted on said carrier to move at an inclination to said axis in order to cut a tapered thread, and a connection between said holder and said cutter for shifting the latter automatically, said connection comprising cam means to feed the cutter along the work as a thread is cut and to return the cutter and cam means to withdraw the cutter from the work and to restore the same after said return, and means to feed the cutters to increase the depth of cut.

9. In a taper thread cutting machine, a work holder and an inclined mounting arranged in relation to a common axis, a cutter movably carried by said mounting, and means to automatically move the mounting with respect to both the work holder and the cutter to feed the cutter to the work and withdraw it from the work in a cyclic succession of progressive cuts.

10. A machine for cutting taper threads, comprising a work holder and a cutter working in relation to a common axis, said work holder being rotatable relative to said cutter, a pair of cam members, a connection between one cam member and the cutter to move the cutter progressively and successively toward and from said axis, and a connection between the other cam member and the cutter to automatically advance and return the cutter axially of the work.

11. A machine for cutting taper threads, comprising a relatively rotary work holder and a cutter carrier working in relation to a common axis, said work holder being movable relative to said carrier, a cutter mounted to move on said carrier at an inclination to said axis, a work carrier sleeve, a cam ring slidably and non-rotatably mounted on said sleeve and connected with said carrier to shift the same, a second cam ring slidably and non-rotatably mounted on said sleeve and connected with said cutter to shift the same, an adjustable connection between said cam rings, and an adjustable connection between one cam ring and the work holder to shift said one cam ring on said work holder.

12. In a taper thread cutting machine, a work holder and an inclined mounting arranged in relation to a common axis, a cutter movably carried by said mounting, means to feed the cutter radially, means to feed the cutter axially, and means correlating said axial and radial feeding means to produce a cyclic succession of progressive cuts.

13. In a thread cutting machine, a work holder and a cutter carrier mounted in relation to a common axis, a cutter movably mounted on the carrier, means to move the cutter axially, means to move the cutter radially, and means to correlate the radial and axial moving means to produce a succession of progressive cuts.

In testimony whereof I affix my signature.

EDWARD A. ROBERTS.